(12) United States Patent
Pfeiffer

(10) Patent No.: US 12,453,015 B2
(45) Date of Patent: Oct. 21, 2025

(54) METHOD AND DEVICE FOR MANUFACTURING A MULTIPLICITY OF COMPONENTS WITH AT LEAST ONE ELECTRICAL FEEDTHROUGH AND AN INFORMATION STORE, COMPONENT, AND METHOD AND DEVICE FOR THE FURTHER PROCESSING OF SUCH COMPONENTS

(71) Applicant: Schott AG, Mainz (DE)

(72) Inventor: Thomas Pfeiffer, Kumhausen (DE)

(73) Assignee: Schott AG, Mainz (DE)

( * ) Notice: Subject to any disclaimer, the term of this patent is extended or adjusted under 35 U.S.C. 154(b) by 378 days.

(21) Appl. No.: 17/957,173

(22) Filed: Sep. 30, 2022

(65) Prior Publication Data

US 2023/0099977 A1 Mar. 30, 2023

(30) Foreign Application Priority Data

Sep. 30, 2021 (DE) ...................... 10 2021 125 343.8

(51) Int. Cl.
*H05K 3/40* (2006.01)
*G06K 19/06* (2006.01)
*H05K 1/11* (2006.01)

(52) U.S. Cl.
CPC ..... *H05K 3/4038* (2013.01); *G06K 19/06018* (2013.01); *G06K 19/06037* (2013.01); *H05K 1/115* (2013.01)

(58) Field of Classification Search
CPC .............. B60Y 2410/12; B60R 21/264; B60R 22/4628; G06Q 50/04; G05B 2219/31304;
(Continued)

(56) References Cited

U.S. PATENT DOCUMENTS

2006/0222881 A1* 10/2006 Fink ........................ F42B 3/198
428/621
2007/0067134 A1 3/2007 Borowicz et al.
(Continued)

FOREIGN PATENT DOCUMENTS

DE 20 2010 008 564 U1 2/2012
DE 10 2015 006 512 A1 12/2016
(Continued)

OTHER PUBLICATIONS

German Office Action dated Sep. 12, 2022 for German Patent Application No. 10 2021 125 343.8 (14 pages).

*Primary Examiner* — Moshe Wilensky
(74) *Attorney, Agent, or Firm* — TAYLOR & EDELSTEIN, PC

(57) ABSTRACT

A method for manufacturing a plurality of components, each of the plurality of components including at least one electrical feedthrough, in which a functional element is fastened in a feedthrough opening in a base body by way of an electrically insulating material, an information being acquired in association with each of the plurality of components, the method comprising the steps of: providing, in one of a plurality of manufacturing steps of the method, each of the plurality of components or one of a plurality of pre-stages of each of the plurality of components with an information store, at least one of (i) the information being stored in the information store, and (ii) an identifier is stored in the information store and the information is stored in a database in association with the identifier.

12 Claims, 5 Drawing Sheets

(58) Field of Classification Search
CPC ........... G05B 2219/32187; G05B 2219/32206; G05B 2219/32212; G05B 2219/32216; G05B 2219/31095; G05B 2219/32179; G05B 2219/32196; G05B 19/41875; G05B 19/4183; G06K 19/06; G06K 19/06037; H05K 3/4038; H05K 1/115

See application file for complete search history.

(56) References Cited

U.S. PATENT DOCUMENTS

| | | |
|---|---|---|
| 2011/0168586 A1 | 7/2011 | Glueck et al. |
| 2019/0054677 A1 | 2/2019 | Schmitz |
| 2021/0039420 A1 | 2/2021 | Costa |
| 2021/0232126 A1 | 7/2021 | Feyo Gebhard |
| 2023/0305541 A1* | 9/2023 | Glitza ................ G05B 19/4183 |
| 2024/0246131 A1* | 7/2024 | Weber ................... B21C 51/005 |

FOREIGN PATENT DOCUMENTS

| | | |
|---|---|---|
| DE | 10 2020 216 272 A1 | 7/2021 |
| EP | 1 455 160 A1 | 9/2004 |

* cited by examiner

METHOD AND DEVICE FOR MANUFACTURING A MULTIPLICITY OF COMPONENTS WITH AT LEAST ONE ELECTRICAL FEEDTHROUGH AND AN INFORMATION STORE, COMPONENT, AND METHOD AND DEVICE FOR THE FURTHER PROCESSING OF SUCH COMPONENTS

CROSS REFERENCE TO RELATED APPLICATIONS

This claims priority to German patent application no. 10 2021 125 343.8, filed Sep. 30, 2021, which is incorporated herein by reference.

BACKGROUND OF THE INVENTION

1. Field of the Invention

The present invention relates to a method for manufacturing a multiplicity of components with at least one electrical feedthrough, in which a functional element is fastened in a feedthrough opening in a base body by way of an electrically insulating material, wherein information is acquired in association with each of the components. Further aspects of the present invention relate to such a component, assemblies of multiple such components, devices for manufacturing such components, methods and devices for the further processing of such components and the use of the components in an ignition unit for airbags or an igniter for seatbelt tensioners.

Although the present invention may generally be applied to any components, the present invention is explained in connection with components in the form of feedthrough elements of igniters for airbags and/or seatbelt tensioners in passenger restraint systems.

2. Description of the Related Art

Passenger restraint systems are used in a wide variety of ways in land vehicles, watercraft, spacecraft or aircraft, in particular in motor vehicles, for example in the form of seatbelt tensioners that exert a pulling force on a seatbelt of a respective occupant of the motor vehicle and increase the restraining force on the occupant. In this case, for example, a pulling force is exerted on a seatbelt by way of a piston that is operated by the gas pressure generated by a gas generator.

Airbag systems are another passenger restraint system, in which at least one airbag that is inflated in an extremely short time is intended to be used to protect the occupants of the vehicle in the event of a vehicle collision involving a side-on impact or a front-on impact. Passenger restraint systems in the form of airbag systems are intended to use airbags to prevent the vehicle occupants from colliding with the hard structure of the vehicle.

Such airbag systems often have an ignition unit and a solid fuel. The ignition of the solid fuel gives rise to hot gas that flows through a filter into the airbag and deploys same. In addition to this, airbag systems that trigger an explosive charge by way of an ignition unit and destroy a membrane between a pressurized gas store and the airbag to be deployed, such that said airbag is deployed, have also become known.

The ignition units include for example, as disclosed by EP 1 455 160, a feedthrough element having a base body for an ignition capsule consisting of a circular disc made of weldable material having a top side and a bottom side and having at least one through-opening for a glass insulator, wherein the at least one through-opening is in the form of an elongate hole on the top side and ends in a circle on the bottom side. A contact pin is held in an electrically insulating fastening material in an electrically insulating manner in the through-opening. The fastening material is usually a glass or glass-ceramic material in which the contact pin is melted. Plastic fastening materials have likewise already been described.

High requirements are placed on the electrical feedthrough formed from the through-opening, the glass insulator and the contact pin, in particular for use in an ignition unit. When igniting the ignition unit, it is necessary to ensure that the contact pins are not pressed out of the through-opening. The penetration of moisture from the surroundings into the ignition unit through the electrical feedthrough should also in particular be prevented, and so the electrical feedthrough is optionally configured to be hermetically sealed.

Such feedthroughs for ignition units are manufactured in some production steps in prefabricated component carriers, for example for every 100 parts or more. A batch of corresponding feedthroughs for ignition units may in this case include several tens of thousands of parts, for example 80,000 parts. Before the manufactured feedthroughs are dispatched to the manufacturer of the ignition units, they are subjected to a random or 100% quality assurance exit inspection. The received feedthroughs are again subjected to an in-depth receiving inspection at the manufacturer of the ignition unit itself, in order to ensure that they meet the respective specification agreed with the manufacturer of the ignition units. This requires a large amount of effort for the manufacturer of the ignition units.

To reduce this effort, it has been disclosed likewise to perform the receiving inspection only on a random basis, but this leads to the accuracy in the inspection as to whether or not the feedthroughs of the ignition units meet the agreed specification being considerably reduced due to the large number of feedthroughs already in an individual batch. In addition, an individual feedthrough identified as defective may lead to a complete batch being rejected as defective. If the respective batch number is communicated to the manufacturer of the ignition units, said manufacturer is however barely, if at all, able firstly to ascertain what led to defective production of the ignition unit under test, and secondly to ascertain whether and possibly to what extent other ignition units of the respective batch are also defective. Furthermore, the ability to further process the ignition units is made considerably more difficult, since, upon establishing a single defective ignition unit in a batch, the whole batch then has to be tested or inspected or a new batch has to be used. The results of the inspection may be used likewise to reject or to inspect batches at the manufacturer.

That said, what is needed in the art is a component that is assigned information that is required for quality assessment and for traceability.

What is also needed in the art is a method and a device that make the manufacturing parameters of a component during manufacture thereof traceable.

What is also needed in the art is a method and a device that make available the information assigned to a component during the further processing of the component to form units that contain at least one such component. The information is in this case in particular used to control the further processing of the components to form the units using the information assigned to the components.

SUMMARY OF THE INVENTION

The present invention thus relates in particular to the entire manufacturing chain from the introduction of the materials to the manufacture of the component and the further processing of the component to form units that each contain at least one such component. The present invention in this case also relates to manufacturing methods involving an exit inspection of the components as intermediate product and further processing methods involving a receiving inspection at a further processor that further processes the components to form the units, which represent the end product in the sense of the present description.

The present invention provides a method for manufacturing a multiplicity of components. The components have at least one electrical feedthrough, in which a functional element is fastened in a feedthrough opening in a base body by way of an electrically insulating material. Provision is made in the method to acquire information relating to a component in association with each of the components. This information is in this case optionally selected from one or more of the group containing information relating to starting materials used, information relating to manufacturing steps carried out, information relating to tools and installations used, information relating to measurements and a unique identifier.

At least one of the pieces of information is optionally specific to individual components, in particular to each single one of the components.

Provision is furthermore made, in one of the manufacturing steps of the method, for each component or one of the pre-stages of each component to be provided with an information store, wherein information assigned to the component is stored in the information store. As an alternative or in addition thereto, a unique identifier or ID is stored in the information store and the further information assigned to the component is stored in a database in association with this identifier. The information store may for example be configured as an optically readable marker, in particular as a barcode or as a matrix code that codes the identifier or ID. Other embodiments, such as for example as an electronic store such as an RFID chip or a flash memory, are however also conceivable.

The database is optionally implemented by a computer apparatus, which may be for example a server, in particular a cloud server, that is able to communicate with other computer apparatuses via a data network. The data network may be a local area network that for example networks multiple apparatuses with one another in a production facility. The data network is optionally the Internet, meaning that the information stored in the database is able to be retrieved at any time from any location.

The component that is obtained in particular using the proposed method is optionally designed and/or configured to be received, in a further processing step, as a part in a unit, wherein the component in this unit provides at least one electrical feedthrough.

The component may for this purpose for example include a base body that has a through-opening for each of the electrical feedthroughs. The base body is optionally made from a metal, wherein the through-opening may be produced for example by punching, milling or drilling.

A functional element is arranged in the through-opening and may be configured for example as a connection pin, in particular as a metal pin. The functional element is fastened in the through-opening with an electrically insulating material. The electrically insulating material is optionally a glass, a glass-ceramic or a ceramic. However, it is also conceivable to use other electrically insulating materials, such as for example a plastic, or mixtures of multiple insulating materials, such as for example a mixture of a glass and a plastic.

Surrounding and fastening the functional element in the through-opening with the electrically insulating material closes and thus seals the through-opening. This sealing is optionally hermetically tight in order in particular to prevent the penetration of moisture through the electrical feedthrough. Hermetically tight is understood as meaning here an electrical feedthrough having a helium leak rate of less than $1 \cdot 10^{-5}$ mbar·l/sec and optionally within a range from $1 \cdot 10^{-10}$ mbar·l/sec to $1 \cdot 10^{-6}$ mbar·l/sec. The helium leak rate is optionally measured in accordance with DIN EN60068-2-17 or MIL-STD-883 method 1014.9 condition A4.

Optionally, in the method, each component or a pre-stage of each component is uniquely identified, in at least one manufacturing step, via its position in a component carrier. The component carrier is in this case optionally assigned a component carrier identifier that uniquely identifies same. This component carrier identifier is for example stored in an information store arranged on the component. It is accordingly optional, in the manufacturing step of the method, to identify the components or their pre-stages by reading the information store of the component carrier and the position in the component carrier. The information store of the component carrier may for example be configured as an RFID chip or as an optically readable marker, in particular as a barcode or as a matrix code that codes the component carrier identifier.

The component carrier may be for example a molding tool that receives multiple components or their pre-stages, for example in order to sinter a glass blank or to perform vitrification in a furnace after the metal pins have been mounted. The component carrier may be any kind of holder by way of which the component or its pre-stages may be handled during the manufacturing method.

Each component or a pre-stage of each component is optionally uniquely identified in at least one manufacturing step of the method by reading the information store of the component.

One exemplary embodiment of the method may for example include, as one step, providing a starting material for the base body. In a subsequent step, the base body is shaped, for example using punches, mints, mills, drills and the like, wherein at least one through-opening is formed in the base body. Provision is in particular made in this case, following separation of the base body from a starting material, for example following punching from a metal sheet or separation from a bar material, to track each base body individually. Since, at this time, no information store is yet connected to the base body, the tracking is performed using the position of the respective base body in the processing device, for example by storing the base body in a predefined position of a component carrier after it has been separated from the starting material. Indications such as for example the respectively used starting material, the tool used to form the base body and/or the time of manufacture may accordingly be assigned as information to this specific base body as starting product for the subsequent component. As an alternative to individually tracking each individual base body, at this time of the method, it is however also possible to perform tracking of a batch of base bodies, wherein the entire batch of base bodies is assigned the same information.

The method likewise includes providing the electrically insulating material. The electrically insulating material may be provided for example in the form of a powder that is shaped to form a blank to be inserted into the through-opening in the base body, for example by sintering. This blank, following shaping, may again be tracked individually by tracking its position in the processing device, for example by tracking the position of the blank in a carrier. Indications such as for example the respectively used starting material, the tool used to shape the blank and/or the time of manufacture may accordingly be assigned as information to the respective blank as starting product for the subsequent component. As an alternative to individually tracking each individual blank, at this time of the method, it is however also possible to perform tracking of a batch of blanks, wherein the entire batch of blanks is assigned the same information.

The method furthermore includes providing a functional element, for example in the form of a connection pin, in particular a metal pin. The metal pin may for example be obtained by separation from a starting material provided in the form of a wire. The metal pin, following separation, may be tracked individually by tracking the position of the metal pin in the processing device, for example by tracking the position of the metal pin in a carrier. Indications such as for example the respectively used starting material, the tool used to obtain the metal pin and/or the time of manufacture may accordingly be assigned as information to the respective metal pin as starting product for the subsequent component. As an alternative to individually tracking each individual metal pin, at this time of the method, it is however also possible to perform tracking of a batch of metal pins, wherein the entire batch of metal pins is assigned the same information.

The provision steps, which may be carried out in parallel or successively in any order, are followed by a mounting step. In the mounting step, a respective metal pin and a blank are inserted into a through-opening in the base body. The mounting step is followed by a melting step in which the blank is melted and the hermetically tight electrical feedthrough is obtained.

The mounting step and the melting step take place using a component carrier that has uniquely identifiable receptacles for the components to be manufactured. The component carrier is for example designed as a graphite mold, wherein each of the receptacles is formed as a recess in the graphite mold or carbon mold. In the mounting step, for example, a graphite mold is provided as a component carrier that is uniquely identifiable. Next, a respective base body is inserted into each of the receptacles of the graphite mold, and a blank and a metal pin are inserted into each through-opening in the base body. In this case, each receptacle of the graphite mold that is able to be identified uniquely is assigned the information assigned to the inserted pre-stages of the component, such that for example the used materials, tools and manufacturing times for the base body, the blank and the metal pin are also able to be tracked in connection with each receptacle of the graphite mold.

The graphite mold thus populated is then put into a furnace to carry out the melting step and stays there for a predefined time at a predefined temperature in order to obtain the finished electrical feedthrough. The parameters for performing the melting step are again assigned to the graphite mold as component carrier and thus to all of the components received in this component carrier.

The melting step is optionally followed by an inspection step in which all finished components or at least a random sample of the finished components are surveyed. The result of this survey is optionally assigned to these components as further information.

The manufacturing method may include further manufacturing steps. By way of example, in a coating step, it is possible to coat surfaces, for example of specific pre-stages of the component such as the base body and the connection pins. For this purpose, provision may possibly be made, as preparation, for a pretreatment step in which the surfaces to be coated are cleaned and/or pickled.

Before the components are output, the proposed method makes provision to arrange an information store on the component or on a pre-product of the component. This arrangement of the information store may take place at various times in the manufacturing method. An information store arranged on the base body may be arranged thereon at any time following the provision of the base body. Accordingly, an information store arranged on a metal pin may be arranged thereon at any time following the provision of the metal pin.

Following the arrangement of the information store, this may be read in order to uniquely identify a component or a pre-stage of the component. For this purpose, provision is optionally made for the information store to contain a unique identifier as information.

The information obtained during the individual manufacturing steps of the method in association with the component or its pre-products is optionally stored in a database and linked with the respective component via the identifier stored in the information store. Provision may in particular be made in this case for this information assigned to the component to be supplemented continuously, for example following each step or following selected steps of the manufacturing method. These steps may in this case in particular include machining steps and inspection steps.

In the manufacturing method, there is optionally a final inspection to which a random sample of the components or each component is subjected, in which at least one property of the component is measured, and results of this final inspection are assigned to the component as information. Such a final inspection is advantageous in particular in the production of safety-relevant components, such as feedthroughs for ignition units for airbags and/or seatbelt tensioners.

The properties of the component may be for example geometric properties such as the dimensions of the component. By way of example, properties such as the insulation resistance between the functional element and the base body, or the sealtightness of the electrical feedthrough, may also be inspected in the final inspection. It is also conceivable to inspect a random sample of the components for a press-out force of the electrical feedthrough.

The results obtained in the final inspection are optionally compared with predefined threshold values, and components in which at least one predefined limit value is exceeded are optionally ascertained. It is thereby possible to ascertain components that do not meet the predefined requirements. These identified components may be discarded, where possible reworked, or possibly may be graded into a lower quality class.

If components are subjected to reworking, information is optionally also acquired here and assigned to the component. This information may in particular include indications regarding the materials, tools and installations used and the individual steps applied in the reworking. The information store or an associated database entry may then be supplemented accordingly.

The outputting of the components may include a packaging step in which an entirety of components or a batch of components are received and packaged in a carrier such as outer packaging. This outer packaging may be provided with an assembly information store that may include information about the outer packaging itself and about the individual components received therein. By way of example, a batch number or the unique identifiers of the contained components may be stored in the assembly information store. However, it is also conceivable here for example to store the unique identifiers of the components received in the outer packaging in a database and to link them with an identifier of the outer packaging, which is then stored in the assembly information store.

In the method, provision is optionally made for at least one step in which, for the ascertained components with at least one exceeded limit value, their assigned information is evaluated and, for the ascertained components, common information is determined as to which of the ascertained components are identical or match to within a predefined tolerance.

In this step, similarities between the components with ascertained deviations are determined. By way of example, it could be established here that all components that were received in a particular mold were machined with a particular tool, were treated in a particular furnace or were machined by a particular operator do not meet the requirements and therefore exceed or fall below a predefined limit value for at least one property. The identification of such similarities is useful in particular for identifying causes for lack of compliance with the limit values.

The information for the ascertained components with at least one exceeded limit value may be evaluated for example using machine learning methods or artificial intelligence. By way of example, this may be used to identify complex correlations between particular production ways or production conditions.

Provision is optionally furthermore made in the method for manufacturing steps, starting materials, tools and/or process conditions that these components have in common to be ascertained from the common information, and for quality improvement measures for future runs of the production steps of the method to be initiated in accordance with the result of this determination. These measures are optionally selected from the exchange of a tool, the exchange of a component carrier, the exchange or the calibration of a measuring device, the performance of corrections to process parameters, the selection of other starting materials, the correlation of different production processes and combinations of a plurality of these measures.

If for example it is established in the method that all components that were machined with a particular tool do not comply with a predefined limit value, it may be concluded that this tool is worn. The tool in question may then be exchanged as a measure.

In the proposed method, the traceability of the individual components and the assignment of the specific information to these individual components may advantageously be used to continuously monitor and to optimize the method for manufacturing these components. In particular in the case of adjustable process parameters, such as for example the temperature and the duration when performing the melting step, the process parameters may be optimized in the manner of a control loop.

In the method, already essential parameters of the respective component may advantageously already be assigned prior to the manufacture thereof or an entirety of components and stored individually for each component or entirety or group of components based on the respective identifier. Starting materials and/or pre-stages of the component may in particular be tracked individually and assigned later to the component in which they were installed. This makes it possible to provide a multiplicity of parameters relevant to the manufacture, production and further processing of each of the components, which are then readily available as components identified as defective during troubleshooting. This enables faster and more efficient troubleshooting. At the same time, production is able to be monitored more closely and defective components are able to be identified and rejected possibly even before they are supplied to clients or further processors. In addition to this, production is able to be adjusted or corrected more quickly, which improves the rejection rate during production of components and improves quality during manufacture. A further advantage is that data already selected for the client or further processor are able to be transmitted individually for each related component or group of components, such that the receiving inspection thereof is able to be completely or at least partially dispensed with, which saves time and costs.

A further aspect of the present invention relates to a component with at least one electrical feedthrough, in which a functional element is fastened in a feedthrough opening in a base body by way of an electrically insulating material, wherein the component includes an information store. The information store is optionally integrated fixedly into the component or connected inseparably thereto.

The component is optionally obtained using a manufacturing method described herein.

The present invention also relates to an assembly of such components, wherein the assembly of components is received in a container, wherein the container includes an assembly information store and wherein the assembly information store contains indications for identifying the components contained in the assembly.

The container may in this case be designed as a component carrier or include same, wherein the component carrier is designed for example as a plate-shaped element having a multiplicity of recesses for receiving a respective component.

The assembly information store may for example include an assembly identifier via which information about which components are part of the assembly is able to be retrieved from a database. The corresponding information may however also be stored directly in the assembly information store itself. The information about the components of the assembly may in turn be in the form of an identifier for retrieving assigned information from a database and/or likewise be stored directly in the assembly information store.

The assembly information store allows a receiver or a further processor to incorporate the information for a multiplicity of components in one step into a data processing system such as a computer apparatus assigned to a production installation, without the information store of each individual component itself having to be read. Since however each individual component has its own information store, the corresponding component-related information may be assigned individually to each individual component in the course of a further processing process.

A further aspect of the present invention relates to a method for the further processing of the described components, an assembly of components or components obtained using one of the methods described herein to form units that each contain at least one of these components. Provision is made in this case for information assigned to a respective component to be obtained and assigned to a respective one of the units. Provision is furthermore made for obtaining the information assigned to a component to include reading an information store of the component or reading an assembly information store of a container that receives one or more components.

The further processing method may be performed immediately following the manufacturing method or be performed at any later time. The present invention also accordingly relates to combined methods in which a component is initially manufactured and then processed further to form the unit. The further processing method may in particular be carried out at another location by a further processor that procures the components as a pre-product from a component producer.

In the further processing method, in at least one further processing step, at least one parameter is optionally adapted on the basis of information assigned to the component.

By way of example, geometric parameters of a component may be acquired here by reading the information store of the respective component, and process parameters dependent thereon may be taken into consideration during the further processing of the component to form the unit.

A parameter contained in the information assigned to the component may be measured again during the further processing method and compared with the corresponding information contained about the information store assigned to the component.

The comparison is optionally repeated for multiple components, these being a random sample from an entirety of the components, or the comparison is repeated for all components of the entirety, wherein, upon identification of a systematic deviation, a correction factor is ascertained and is used to correct assigned information even for components of this entirety that are not surveyed again.

The entirety of the components may in particular be the components of a batch or the components of an assembly.

This repeated measurement of parameters of a component and comparison with the corresponding information previously assigned to this component makes it possible for example to identify different calibrations of measuring apparatuses and to take them into consideration using a correction factor, such that, following an appropriate correction, the information stored in association with the individual components is able to be used to control the further processing method without having to survey the corresponding parameters for each individual component again.

The repeated measurement of parameters of a component and comparison with the corresponding information previously assigned to this component may furthermore be used, at a further processor of the components, to monitor and to document the reliability of the information previously ascertained and stored during the manufacture of the components for quality assurance purposes.

In the proposed method for the further processing of components to form units that may each contain at least one such component, in particular for quality assurance purposes, the information store of the individual components and/or an assembly information store of a container containing a multiplicity of components may be read and supplement or replace measurements or tests on predefined parameters of the components in the course of a receiving inspection. If, in the receiving inspection, components that exceed or fall below limit values predefined for at least one parameter are identified, the information assigned to the individual components may advantageously be used to identify further components that could likewise exceed limit values. This may for example be performed by examining information from the components that exceed limit values or fall below limit values for similarities. If for example it is identified that all components that were manufactured using a particular tool do not comply with a predefined limit value, only these have to be discarded and other components from the same entirety may be used for the further processing. These findings may furthermore be used to optimize the manufacture of further components.

Arranging an information store on the component facilitates the unique assignment of error images identified in the further processing to particular conditions or ways in the manufacture of the components. Since the tracking in the method for manufacturing the components may already be used for the respective starting materials and pre-stages, specific error images may be assigned to even individual pre-products and starting materials of the components. By virtue of this assignment, a further processor of the components may give feedback to the manufacturer of the components, for example in order to optimize the manufacturing method and/or in order to discard or rework further components that exceed limit values even before they are dispatched. In this case, such an assignment is still possible in particular when components from different batches are mixed, since each component is provided individually with an information store.

These advantages may also be achieved when the manufacture of the components and the further processing thereof to form units take place in a manner spatially, temporally and/or organizationally separated from one another. The manufacture of the components and the further processing thereof to form the units may in particular take place in different production facilities. In this case, the further processor of the components may in particular be organizationally independent of the manufacturer of the components. If the information store of the components does not directly contain the assigned information, but rather stores an identifier for retrieving the information from a database, the manufacturer of the components may for example provide the database, wherein the further processor of the components is given access to the database via a data network such as the Internet. Provision may be made in this case to restrict the access rights such that the further processor receives only read access and/or is only allowed to retrieve selected information about a component.

The further processor, in the same way as the procedure during the manufacture of the components, may also, during the further processing to form a unit, acquire information in association with individual units and store it in unique association with a unit. The storage may in turn for example take place in an information store arranged on the unit, or an information store arranged on the unit may contain a unique identifier that allows access to a dataset stored in a database and containing the assigned information. If an information store of a component installed in the unit is still accessible following the further processing, this may be further used for this purpose and for example make the entire unit traceable. Otherwise, a further information store may be arranged on the unit.

Provision is optionally made to acquire information relating to the starting materials used and/or the manufacturing steps carried out and/or indications regarding tools and installations used and/or indications and results regarding measurements, in particular a measurement performed following a manufacturing step, and/or a unique identifier in association with each of the components.

The unique identifier may in this case be used firstly to uniquely identify the respective component. If not all of the information assigned to the component is acquired in the information store itself, but rather in a database, the unique identification may also be used to access information assigned to the component in a database.

Indications about the starting materials used may be acquired for some or for all of the starting materials used. Examples of material data include in particular indications:
- about the type of material respectively used;
- about the manufacturer;
- about the supplier;
- about the supply date;
- about the batch; and
- about manufacturing parameters of the material.

Indications relating to manufacturing steps may be acquired for some or for all of the manufacturing steps performed. These indications may include in particular an indication of the type of manufacturing step performed and/or indications about the parameters used in the manufacturing step. Examples of information relating to the manufacturing steps carried out include in particular indications:
- about the position of the component or a pre-stage of the component in a carrier;
- about the carrier used or the workpiece holder used, in particular a corresponding identifier;
- about the parameters used;
- about the operator or installation manager; and
- about the time of the machining.

Indications about tools and installations used may be acquired for some or for all of the tools and installations used during manufacture. Examples of information relating to the tools and/or installations used in a manufacturing step include in particular:
- an identifier for identifying the tool or the installation, such as for example the temperature of a furnace;
- indications about used parameters of the tool or of the installation; and
- indications about the time of the machining.

Examples of information relating to measurements or inspections include in particular:
- indications about the type of measurement or inspection;
- indications about the time of the measurement or inspection or final inspection;
- a measuring device identifier or inspection installation identifier;
- indications about the inspection installation operator; and
- the measurement result or inspection result.

The information that may be assigned to one of the described components is thus in particular selected from:
- unique identifier;
- material data;
- position of the component or a pre-stage of the component in a carrier;
- operator or installation manager;
- time of the machining in the tool and/or installation;
- tool and/or installation identification;
- tool and/or installation parameters;
- time of the inspection;
- inspection installation identifier;
- inspection result;
- inspection installation operator;
- inspection installation parameters;
- measurement result;
- time of the final inspection;
- carrier used or workpiece holder used;

and combinations of several of these pieces of information.

Of course, it is however also possible and conceivable to acquire other information in association with the component and to link it with the information store and/or to store it therein. In particular, it is possible to acquire all information relevant for documentation purposes or assessing the quality of the components and to store it in the information store itself or in a database in association with the information store.

Information that is identical for a multiplicity of components is in this case optionally stored only once in a database as group information, wherein a respective reference to this group information is then assigned to the component.

This makes it possible to reduce the amount of data to be stored by storing information that relates in each case to an entirety of components only once.

The group information to which the information assigned to a component refers is in particular selected from:
- material data;
- indications about the carrier used or workpiece holder used;
- installation manager or operator for the group of components;
- time of the group machining in the installation and/or tool;
- installation and/or tool identification of the group machining;
- tool and/or installation parameters of the group machining;

and combinations of several of these pieces of group information.

The information store of a component or the assembly information store of a container is optionally designed as an optically readable marker. It is accordingly optional for the information store designed as such an optical marker to be formed externally on the component such that it is accessible for optical reading. As an alternative or in addition thereto, it is conceivable to design the information store of a component or the assembly information store as an electronic store such as an RFID chip or a flash memory.

The optically readable marker of the component is optionally provided by a region of the base body of the component in which material of the base body is removed or engraved. For easy reading of the optically readable marker, this is optionally arranged on a surface of the base body that faces outwards during further processing to form a unit, for example to form an ignition unit for an airbag.

As an alternative or in addition thereto, the optically readable marker may be formed on one of the functional elements, in particular on a contact pin. The optical marker may in this case be designed for example as a sequence of notches.

The optically readable marker is optionally configured for simple machine reading, for example using a reader connected to a computer apparatus or the camera of a smartphone. The optically readable marker may be designed for example as a barcode or as a matrix code, in particular as a data matrix code. However, it is also conceivable to configure the optically readable marker as an alphanumeric code, which may then be read using optical character recognition. The optically readable marker is optionally configured to store at least 20 characters.

The optically readable marker has for example a dimension of at most 1 mm×3.5 mm, in particular at most 0.8 mm×3 mm. These compact dimensions mean that the information store, designed as an optical marker, may also be arranged on components with small dimensions and thus also make these small components traceable.

The information store designed as an optically readable marker may for example be obtained using a laser material machining method. For this purpose, for example, an appropriate laser step may be integrated into a method for manufacturing the component. Other possibilities for forming the optically readable marker include in particular punching, in which individual dots of a code are punched with a needle, or printing.

The assembly information store of a container may likewise be designed as an optically readable marker, for example as a barcode or as a matrix code such as a QR code or data matrix code. As an alternative or in addition thereto, it is conceivable to design the assembly information store as an RFID chip or as a flash memory, for example in the form of a USB stick received in the container. In particular in the case of a design as a flash memory, the assembly information store, in addition to an identifier that identifies the container or the assembly, may also include all of the information that is assigned to the components of the assembly.

A further aspect of the present invention relates to a device for manufacturing the components described herein with at least one electrical feedthrough, in which a functional element is fastened in a feedthrough opening in a base body by way of an electrically insulating material. The device in this case includes at least one machining way for providing the components with an information store. The device is furthermore optionally designed to carry out one of the methods described herein for manufacturing the components. For this purpose, the manufacturing device may in particular include a control unit with a programmable computing apparatus that implements the corresponding steps of the manufacturing method by executing an appropriate computer program.

When the information store of the components to be manufactured is designed as an optically readable marker, the machining ways are optionally designed as a laser system for removing material.

The manufacturing device may additionally include reading ways in order to reread the information store, once it has been arranged, during one or more steps. When the information store is designed as an optically readable marker, the reading ways are optionally designed as an optical camera or laser scanner. The corresponding reading way is optionally connected to a control unit of the manufacturing device, such that the information contained in the information store of a component is available in subsequent method steps.

If information about the component is stored in a database that is kept on a spatially remote computer apparatus, then the control unit optionally has a communication unit for connection to a data network, such as for example a local area network or the Internet, in order to be able to access the database.

A further aspect of the present invention relates to a device for the further processing of the components described herein or an assembly of these components or components obtained using one of the methods described herein to form units that each contain at least one of these components. Provision is made in this case for the device to include reading ways for reading the information store of the components or the assembly information store of a container containing the components. The device is furthermore optionally designed to carry out one of the further processing methods described herein. For this purpose, the further processing device may in particular include a control unit with a programmable computing apparatus that implements the corresponding steps of the further processing method by executing an appropriate computer program.

When the information store is designed as an optically readable marker, the reading ways are optionally designed as an optical camera or laser scanner. The corresponding reading way is optionally connected to a control unit of the further processing device, such that the information contained in the information store of a component is available during the further processing. If information about the component is stored in a database that is kept on a spatially remote computer apparatus, then the control unit optionally has a communication unit for connection to a data network, such as for example a local area network or the Internet, in order to be able to access the database.

According to the present invention, provision is also made for a system by way of which information that has been assigned to a component is able to be made accessible to a further processor. The system includes a computer apparatus and a reader connected thereto for reading the information store of the component. The system is optionally configured to read at least one piece of information about a measurable property of the component from the information store.

As an alternative or in addition thereto, the system is configured as a system that reads a unique identifier coded in the information store of the component or is configured, using the unique identifier, to retrieve at least one piece of information about a measurable property of the component from a database using the unique identifier. The database may be stored in the computer apparatus of the system or be kept on a server. In this case, the system optionally has communication ways in order to communicate with the server. The communication ways are in this case in particular configured for connection to a data network such as the Internet. The proposed system may thus be used in a manner spatially remote from the location of the database.

The system may have measuring ways in order to measure the measurable property of the component. The system may furthermore include comparison ways in order to compare this measurement with the information obtained using the information store. In this case, setpoint values or limit values may be predefined for the comparison, such that the comparison ways are in particular able to determine whether a component complies with the predefined setpoint values or limit values. The proposed system is thus suitable in particular for performing a quality inspection on the components. For this purpose, the proposed system may for example be installed at a further processor of the components and be used for a receiving inspection of the components.

The described component or the component obtained using one of the described methods is optionally used in an ignition unit for airbags or an igniter for seatbelt tensioners.

For use in ignition units for airbags, a base body of the component optionally has a thickness of between 1 mm and 5 mm, optionally 2 mm to 4.2 mm. The through-opening for receiving a metal pin as functional element optionally has a circular or oval cross section, wherein the diameter of the metal pin is for example 0.8 to 1.2 mm and the diameter of the through-opening is for example in the range from 1.6 mm to 3.0 mm.

Tolerances are optionally defined for the component or for its pre-stages and are able to be checked in an inspection step. By way of example, in the case of an ignition unit for airbags, the permissible tolerance may be predefined in the range from +/−0.02 mm-+/−0.04 mm for the diameter of the base body. Actual tolerances may then be acquired and assigned to the component in an inspection step. The result of the inspection may then be assigned to the component as information. It is also possible to grade the components into different quality glasses. For specific dimensions, the tolerance field may be assigned to specific tools and, if permissible tolerances are exceeded, it is possible to perform a targeted correction, for example by exchanging the tool.

This procedure may be performed on the component for a multiplicity of dimensions and other measurable parameters.

It is understood that the features mentioned above and those hereinbelow yet to be elucidated may be used not just in the combination indicated in each case, but also in other combinations or on their own, without departure from the scope of the present invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein, in each case schematically.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
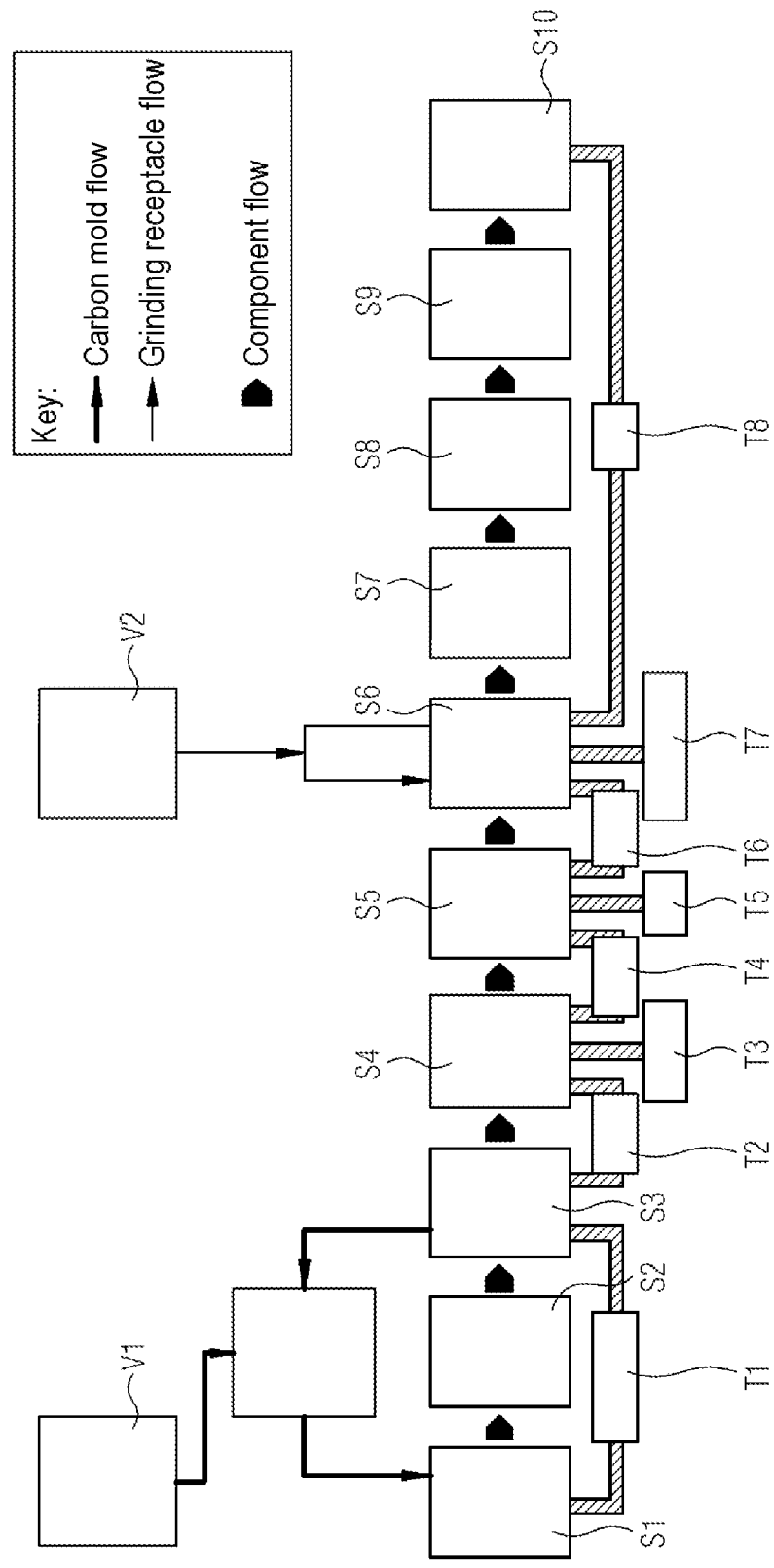
FIG. 1 shows steps of a method for manufacturing components according to one embodiment of the present invention.

FIG. 1 shows steps of an advantageous method for manufacturing components according to one embodiment of the present invention using the example of manufacturing a component for an igniter for passenger restraint systems in the form of airbags.

For this purpose, appropriate molds for manufacturing a multiplicity of feedthroughs for igniters are first of all provided, for example in the form of carbon molds, these being provided with appropriate materials for manufacturing feedthroughs (step S1: mounting). Each of the carbon molds in this case has a multiplicity of receptacles, wherein a feedthrough may be mounted in each receptacle. Accordingly, in this example, step S1 includes a base body, also called header, a blank for the electrically insulating material, and a connection pin being mounted in each of the receptacles.

For the mounting step S1, a carbon mold is provided as component carrier, wherein the carbon mold that is used is identified via a component carrier identifier. The component carrier identifier is stored for example in an information store arranged on the carbon mold, for example an optically readable marker. The optical readable marker is designed for example as a data matrix code. Since the melting step S2, carried out later, is carried out at a higher temperature, the matrix code on the respective carbon mold is optionally designed to be resistant to the thermal loads that occur in the process. New carbon molds are provided in a step V1, provided with an information store and registered. Carbon molds that have already been used once may be reused and are in this case identified by the pre-existing information store or the component information carrier stored therein. In the flowchart of FIG. 1, the flow of the carbon mold is identified by lines of medium thickness provided with arrows.

Further indications about the carbon mold may be stored in the information store of the carbon mold or in an associated database in the course of the method. These indications may for example include the type of carbon mold, indications about the material, number of previous uses and the like.

Information relating to the pre-stages of the header to be manufactured is already assigned to the header to be manufactured in the mounting step S1, wherein the respective header or its pre-stage is identified via the corresponding receptacle of the carbon mold and its component carrier identifier. In step S1, the information is for example selected from indications regarding the mounting team, the batch number of the starting materials or pre-stages used for the headers, metals used for the pre-stages of the components, in particular manufacturer, batch and type, geometry of the headers or the pre-stages, the mounting time and parameters for the mounting. These data are stored for example in a database DB in datasets of the respective headers (see FIG. 2).

Following the mounting step S1, the electrical feedthroughs are produced in a furnace in a melting step S2, wherein the individual components or their pre-stages are assigned the information relevant for the melting step S2. In the flowchart of FIG. 1, the flow of the components is identified by thick arrows.

In this case, as long as the headers or their pre-stages do not yet have an information store, they are uniquely identified and tracked using the respective carbon mold and their position within this carbon mold, which serves as a first information carrier T1 in the method. For this purpose, in the illustrated example of the manufacturing method, the information store of the carbon mold is read and the component carrier identifier stored therein is read. The process parameters used in the melting step, such as for example an identifier of the furnace, time of carrying out, temperature, duration, position of the carbon mold in the furnace and/or operator of the furnace are then assigned to all of the headers or their pre-stages received in the respective carbon mold.

Following the melting in step S2, the components are removed from their previous component carriers and repackaged for transportation to the next manufacturing step. For this purpose, the components, here the headers, are singulated/separated, and, in step S3, they are put into a transport container for further transportation to the next manufacturing step. The transport container, as new component carrier, is likewise provided with an information carrier in the present example, and serves as a second information carrier T2. The information store again in particular contains an individual component carrier identifier of the transport container. The data that were applied to the carbon mold or the like may additionally be stored in the information store itself or in an associated database. The information store of the transport container may in this case be configured for example in the form of a label with an optically readable marker, an RFID tag or the like. Information relating to the respective igniters may in each case be represented by a dataset in a database and be linked with the respective ID code of the transport container. The data such as separation time, separation team, position of the header in the carbon mold, state parameters of the carbon mold, in particular its oxidation level, identifier of the header or the like may then for example likewise be stored in the database in the respective datasets of the respective headers.

The component or its pre-stage may be tracked even following the repackaging using the component carrier identifier and an indication about which component is located at which position in the component carrier. However, provision is optionally made to provide the headers or their pre-stages with an individual information store following the melting step S2 and before the singulation and repackaging according to step S3. In this example, the information store of the igniters is configured as an optically readable marker in the form of a data matrix code that codes an individual identifier of the corresponding header.

The marking of the headers for the application of the information store designed as a data matrix code takes place in particular through laser etching, optionally directly following the melting process, since the base bodies or headers of the igniters are in this case singulated and aligned in the carbon mold. The optically readable marker with the individual ID code or the unique identifier on the respective header is in this case resistant to chemicals in the subsequent machining steps and has a specific surface area of for example 1.5 mm×5 mm, optionally 0.8 mm×3 mm.

Using the transport container as carrier for the components, which is itself inscribed and serves as second information carrier T2 and thus enables identification, the singulated headers are then transported further and then pickled in a further step S4 and gold-plated in a further step S5. The individual components do already have an individual information store that allows unique identification. Reading in a single information store of the transport container before carrying out the next step S4 is however optional here, since in this case only a single information store has to be read in order, for the step carried out, here step S4, to assign relevant information to all of the components received in the transport container at once.

During the cleaning in step S4, use is made of drums whose respective number while carrying out this production step serves as identification or information carrier for the machined components (reference sign T3) and is noted during the further processing. Corresponding parameters of the process step "cleaning" may likewise be noted, for example start and end time of the cleaning, cleaning line, cleaning drum, installation operator and installation parameters. During the gold plating in step S5, corresponding parameters of the process step "gold plating" may likewise be noted, that is to say stored appropriately in the database in the dataset of the igniter, for example start and end time of the gold plating, gold-plating line, installation operator and installation parameters. In this case, an inscribed transport container is again used for transportation between the corresponding pickling and gold-plating apparatus as fourth information carrier T4. During step S5, the ID code applied to the respective header serves as fifth information carrier T5.

Following step S5—gold plating—the components—here the gold-plated headers—are then transported on for grinding by way of a transport container. In this case, the transport container is again identified individually and serves as sixth information carrier T6 and this identification may then again be allocated to the datasets of the respective headers in a database based on the ID code of the respective components.

In a further optional step S6, the headers are then ground. Newly provided grinding receptacles as component carriers are provided, in a step V2, with an information store that again contains a unique identifier of the respective grinding receptacle. The information store is again configured for example as an optically readable marker in the form of a data matrix code. Before using a new or reused grinding receptacle for the grinding step S6, the identifier thereof is read by reading the information store. The flow of the grinding receptacles is identified in the flowchart of FIG. 1 using thin lines provided with arrows.

As long as the headers or their pre-stages are located in a grinding receptacle, this may serve as information carrier T7, wherein the individual headers are identified via the identifier of the grinding receptacle and their position within the grinding receptacle.

Data relating to the respective grinding receptacle may then be stored in the database in association with this identifier and also be stored in the database DB in the respective datasets of the headers that were machined in the respective grinding receptacle. The indications acquired in grinding step S6 in association with a component include for example time of the grinding, grinding machine, grinding receptacle, operator team, installation parameters or the like.

Following the grinding S6, the ground headers are subjected to an individual inspection in a further step S7, wherein, following the removal of the headers from the grinding receptacle, the information store of the components or headers again serves as eighth information carrier T8. In this inspection, for example, the headers are subjected to a function test, and the time of the inspection, the inspection installation number, the test results of each header, installation operator and installation parameters are established. The quality of the header and/or the dimensional tolerance/dimensioning may furthermore be established. The above-mentioned data and parameters may then again be added to the dataset of the respectively inspected header on the basis of its unique identifier or ID code. The headers are then sorted (step S8) and subjected to a final inspection (step S9). In this case, as an alternative to the inspection in step S7 or in addition, the quality of the header and/or the dimensional tolerance/dimensioning may be established and added, in addition to further data such as time of the final inspection and inspector, to the dataset of the respectively inspected header on the basis of its ID code. The commissioning may optionally be performed on the basis of client specifications. Packaging and dispatch to a further processor then take place in a further step S10.

From mounting to dispatching of the headers, high and adjustable transparency of the manufacturing process of each individual header is thus possible. Corresponding data are thus stored for each header individually in the database and available for optimizing processes, analyses, establishing causes of production faults or the like. In particular when analysing the data of the carbon molds and/or the grinding receptacles, the appearance of wear is able to be identified early, such that the corresponding receptacles and molds are able to be exchanged in a timely manner, thereby reducing the rejection rate. In addition to this, correlations in the stored information may be identified, for example using neural networks or the like, and the production may thus be improved or optimized by adjusting material and/or process parameters.

Figure 2:
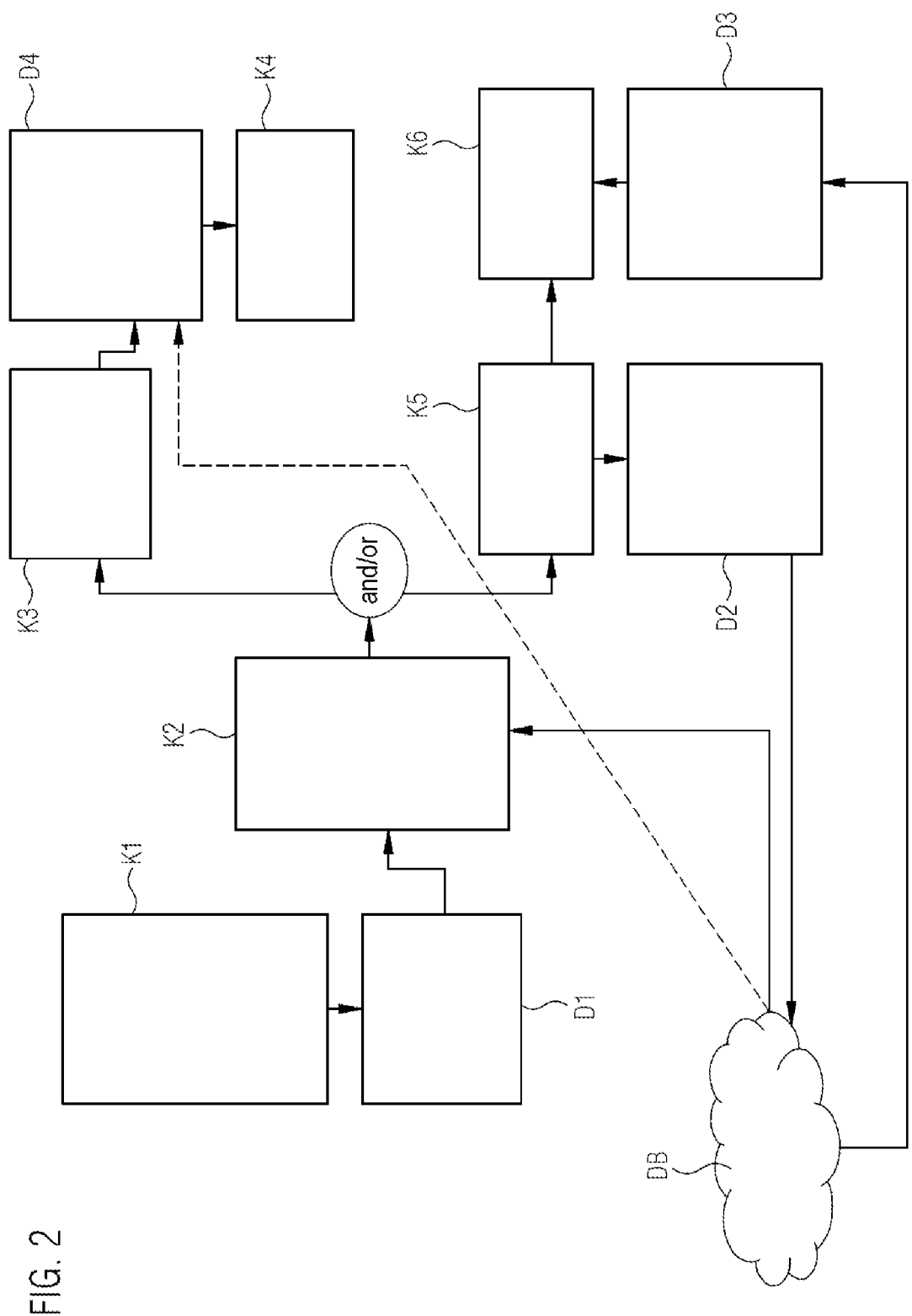
FIG. 2 shows steps of a further processing method according to one embodiment of the present invention.

FIG. 2 shows steps of a method for the further processing of components according to one embodiment of the present invention using the example of the further processing of headers of igniters for airbags.

In detail, the example of FIG. 2 shows method steps that are performed by a further processor as client of the manufacturer of the igniters upon receipt of the igniters.

In a first step K1, a receiving inspection is performed. This involves scanning a control group of headers in order to read the data matrix codes applied thereto and acquiring the individual identifiers or ID codes of the headers. The individual headers are also surveyed. Following this, in a further step D1, a new dataset is generated by the further processor, containing data about the dimensional tolerance/dimensioning of the headers of the control group. Based on the individual ID codes of the headers, the further processor requests corresponding data of the headers from the database DB of the manufacturer of the components. Based on these data, the further processor then performs a comparison in a step K2: It in this case compares its measurement results obtained in step K1 with those from the database DB of the manufacturer of the headers.

The further processor then has two options: The further processor may, on the one hand, in a step K3, decide that the dimensional tolerance meets its requirements on the basis of the comparison performed in step K2. In a further step K4, it then performs the further processing of all of the obtained headers. Beforehand, the further processor, based on the individual ID codes of all of the obtained headers, queries corresponding data of the igniters from the database DB of the manufacturer (step D4). The obtained data from the manufacturer are then used by the further processor to control its further processing.

As an alternative or in addition, the further processor may, on the other hand, based on the comparison in step K2, determine an individual correction factor for each header or an averaged correction factor for a group of headers or all of the headers in a step K5. For this purpose, the further processor generates a respective new dataset (step D2) that contains the corresponding deviations or the respective correction factor in general or individually for each header. In a further step K6, it then performs the further processing of all of the obtained headers taking into consideration the respective or general correction factor. Beforehand, the further processor, based on the individual ID codes of all of the obtained headers, queries corresponding data of the headers from the database DB of the manufacturer (step D3). The obtained data from the manufacturer are then used by the further processor, together with its own obtained datasets from steps D1 and D2, to control its further processing.

The further processor may furthermore use the identifiers of the components to track these components in the obtained units. For this purpose, for example, a new dataset relating to each individual unit may be generated, into which the data acquired about this component from the manufacturer of the components are copied. For unique identification of the datasets, the unit may in turn be provided with a unique identifier or, if the information store arranged on the component is still accessible and readable following the further processing, an identifier present in the information store of the component may be reused.

The further processor may thereby, in this example, precisely track which igniter was installed in which unit and which properties the installed igniter has. In the event of a fault with a unit, the entire production chain may thus be traced back to the pre-products of the component installed in the unit. This makes it possible in particular, by evaluating the information stored in the database, to identify further components and accordingly the produced units that may possibly likewise be impacted by a quality problem, without having to discard all of the components or produced units of a batch from the outset.

Figure 3:
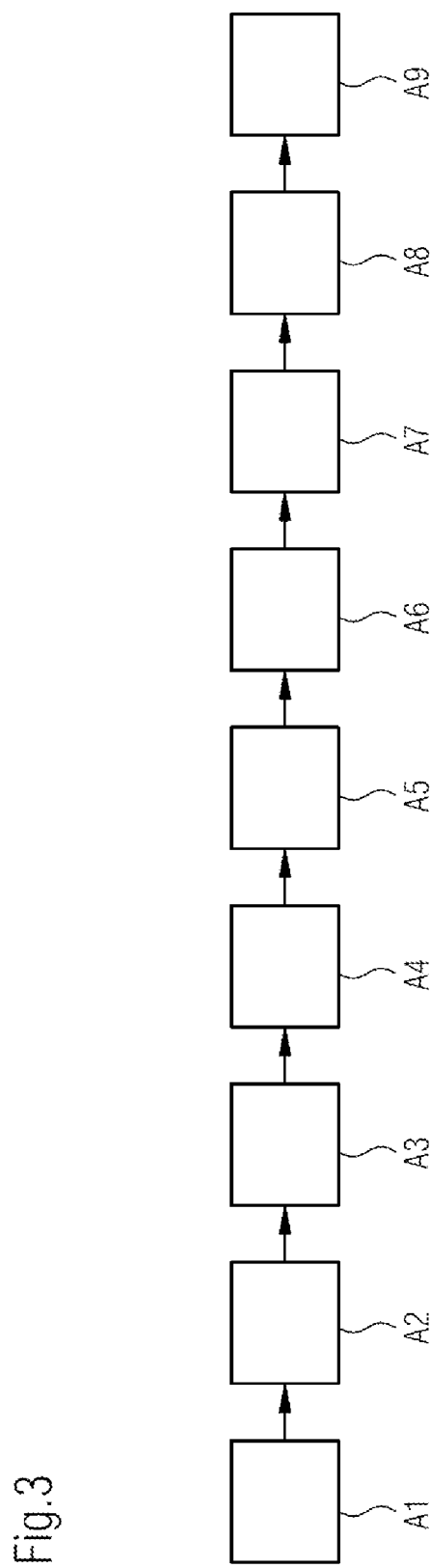
FIG. 3 shows steps of a method according to one embodiment of the present invention.

FIG. 3 schematically shows the optimization of a method for manufacturing components using component-specific information according to one embodiment of the present invention using the example of components for use in passenger restraint systems or the like.

In a first step A1, material data of the pre-stages or materials provided for the manufacture of the components are ascertained.

In a further step A2, at least one manufacturing process parameter for a manufacturing process for manufacturing the components is ascertained.

In a further step A3, the components are manufactured based on a manufacturing process having the ascertained process parameters.

In a further step A4, an individual identification feature is provided for each component in the form of a unique identifier.

In a further step A5, an information store is arranged on each of the manufactured components, wherein the provided identification feature is stored in the information store.

In a further step A6, the component-specific material data and the manufacturing process parameters are stored in a database of a computer apparatus, wherein the identification feature identifies the corresponding dataset in the database.

In a further step A7, a state of at least one of the manufactured components is ascertained, wherein the component is identified via the identification feature, and the result of the ascertainment is stored in the database in association with this component.

In a further step A8, the ascertained state of the component is compared with predefined setpoint values. In this case, components that exceed limit values or fall below limit values are ascertained.

In step A9, from the database for the ascertained components that exceed limit values or fall below limit values, the information assigned thereto is retrieved from the database and analyzed. In this case, common causes for the deviations from the predefined setpoint values are identified and the results are fed back to the method as feedback, for example in the form of changed parameters or an instruction to exchange a tool or a component carrier, in order to optimize the manufacture of the components.

Figure 4:
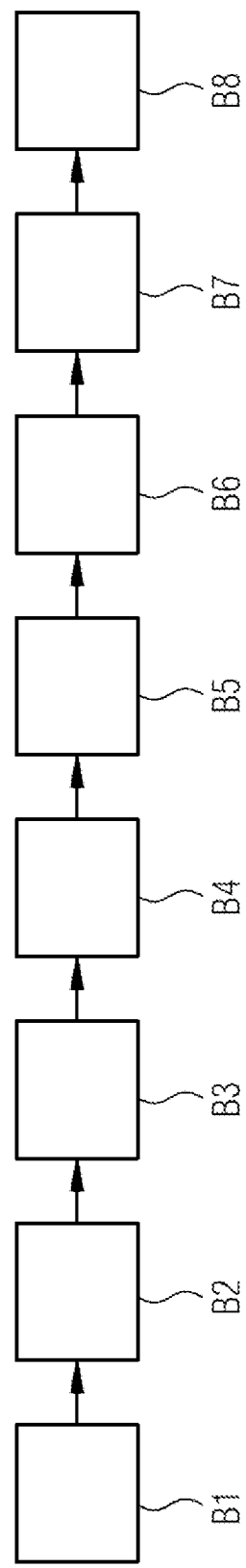
FIG. 4 shows steps of a method according to one embodiment of the present invention.

FIG. 4 schematically shows the provision of information in a method for the further processing of a plurality of components.

In a first step B1, a number of components are combined to form a group.

In a further step B2, a respective component of the group is identified based on its individual identification feature, which is read for example from an information store of the component.

In a further step B3, each identified component of the group is measured at least with regard to an individual piece of state inspection information.

In a further step B4, at least one of the individual pieces of state inspection information for the respective component is requested from the database of the manufacturer of the component.

In a further step B5, at least one of the individual pieces of state inspection information for the respective component is received.

In a further step B6, deviations between at least the measured pieces of state inspection information and the received pieces of state inspection information are ascertained.

In a further step B7, one or more correction parameters are ascertained individually for each component on the basis of the ascertained deviations and, in a further step B8, the respective component is processed further without or with at least partial consideration to the ascertained correction parameters.

Figure 5A:
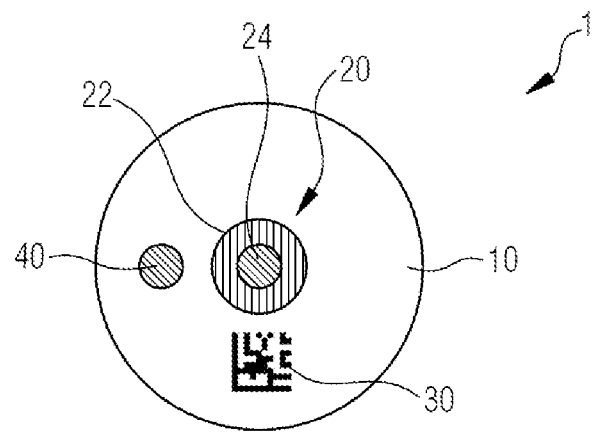
FIGS. 5a, 5b and 5c show exemplary embodiments of components with an information store according to the present invention.
Figure 5B:
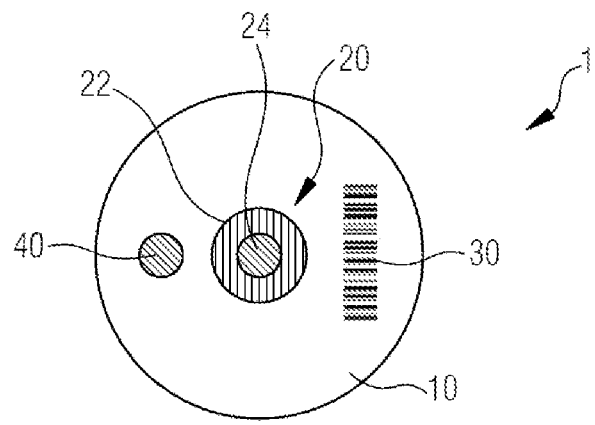
Figure 5C:
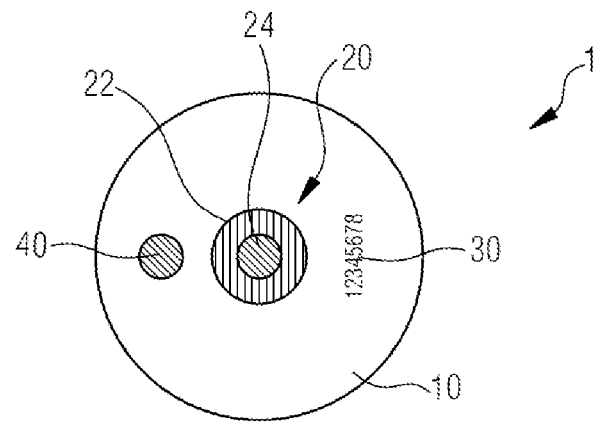

FIGS. 5a, 5b and 5c each show one example of a component with an information store according to the present invention.

In the three illustrated exemplary embodiments, the component 1 in each case includes a base body 10 in which an electrical feedthrough 20 is arranged. The electrical feedthrough 20 is arranged in a through-opening in the base body 10 and has a first metal pin 24 that is held with an electrically insulating material 22. In the illustrated examples, a second metal pin 40 is furthermore electrically connected to the base body 10. The first metal pin 24 serves, in a unit that contains the component 1, for example as signal connection, and the second metal pin 40 serves for example as ground connection.

According to the present invention, the components 1, illustrated by way of example, each have an information store in the form of an optically readable marker 30.

In the first exemplary embodiment of FIG. 5a, the optically readable marker 30 is designed as a matrix code and arranged on the base body 10 such that the first metal pin 24, the second metal pin 40 and the optically readable marker 30 form an angle.

In the second exemplary embodiment of FIG. 5b and the third exemplary embodiment of FIG. 5c, the first metal pin 24, the second metal pin 40 and the optically readable marker 30 are arranged in a line. In the second exemplary embodiment, the optically readable marker 30 is in this case designed as a barcode and, in the third exemplary embodiment, the optically readable marker 30 is configured as an alphanumeric code that is machine-readable, for example by way of optical character recognition.

At least one of the embodiments of the present invention has at least one of the following advantages:

Assigning essential parameters of the respective component already before manufacture thereof.

Individual storage of the essential parameters in a database based on the respective identifier.

Simple provision of a multiplicity of parameters relevant to the manufacture, production and further processing of the component.

Simple, faster and more efficient troubleshooting in the production chain in the case of components identified as defective.

Close monitoring of production.

Faster identification and rejection of faulty components, possibly even before dispatching to clients or further processors.

Reduced rejection rate during production.

Higher overall quality of the components.

Provision of selected data individually for each procured component for further processors or clients, such that their receiving inspection is able to be entirely or at least partially dispensed with, which saves time and costs for clients.

Although the present invention has been described with reference to optional exemplary embodiments, it is not restricted thereto, but rather may be modified in many ways.

LIST OF REFERENCE SIGNS

| | |
|---|---|
| DB | Database |
| A1-A9 | Method steps |
| B1-B8 | Method steps |
| D1-D4 | Dataset method steps |
| K1-K6 | Client process steps |
| S1-S10 | Manufacturing method steps |
| T1-T8 | Information |
| V1, V2 | Registration steps |
| 1 | Component |
| 10 | Base body |
| 20 | Electrical feedthrough |
| 22 | Insulating material |
| 24 | First metal pin |
| 30 | Optically readable marker |
| 40 | Second metal pin |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for manufacturing a plurality of components, each of the plurality of components including at least one electrical feedthrough, in which a functional element is fastened in a feedthrough opening in a base body by way of an electrically insulating material, the method comprising the steps of:

acquiring information associated with each of the plurality of components; and providing each of the plurality of components or one of a plurality of pre-stages of each of the plurality of components with an information store, at least one of (i) the information being stored in the information store, and (ii) an identifier being stored in the information store and the information being stored in a database in association with the identifier, wherein each of the plurality of components or a respective one of the plurality of pre-stages of each of the plurality of components is uniquely identified in at least one of a plurality of manufacturing steps via a position of each of the plurality of components or the respective one of the plurality of pre-stages in a component carrier and via a component carrier identifier that is assigned to the component carrier and uniquely identifies the component carrier.

2. The method according to claim 1, wherein the information is selected as one or more from a group including: an information relating to a plurality of starting materials used; an information relating to the plurality of manufacturing steps which are carried out; an information relating to a plurality of tools and a plurality of installations used; an information relating to a plurality of measurements and a unique identifier.

3. The method according to claim 1, wherein each of the plurality of components or a respective one of the plurality of pre-stages of each of the plurality of components is uniquely identified by reading the information store.

4. The method according to claim 1, wherein a random sample of the plurality of components or each of the plurality of components is subjected to a final inspection, in which at least one property of a respective one of the plurality of components is measured, and a plurality of results of the final inspection are assigned to the respective one of the plurality of components as information.

5. The method according to claim 4, wherein the plurality of results obtained in the final inspection are compared with a plurality of predefined setpoint values, and respective ones of the plurality of components that exceed at least one predefined limit value are ascertained.

6. The method according to claim 5, wherein the respective ones of the plurality of components that are so ascertained to have exceeded the at least one limit value are referred to as a plurality of ascertained components, an assigned information of the plurality of ascertained components is evaluated, and, with respect to the plurality of ascertained components, a common information is determined as to which of the plurality of ascertained components are identical to or match within a predefined tolerance.

7. The method according to claim 6, wherein at least one of the plurality of manufacturing steps, a plurality of starting materials, a plurality of tools, and a plurality of process conditions that the plurality of ascertained components have in common are ascertained from the common information, and in accordance therewith a plurality of quality improvement measures for a plurality of future runs of the method are initiated, wherein the plurality of quality improvement measures are selected from the following: an exchange of a tool; an exchange of a component carrier; an exchange or a calibration of a measuring device; a correction of a plurality of process parameters; a selection of other ones of a plurality of starting materials; and a plurality of combinations of the plurality of quality improvement measures.

8. The method according to claim 1, wherein the information that is identical for a multiplicity of the plurality of components is stored only once in the database as a group information, and a respective reference to the group information is assigned to a respective one of the plurality of components.

9. The method according to claim 1, wherein the information store is designed as an optically readable marker.

10. The method according to claim 9, wherein the optically readable marker is formed on the functional element.

11. The method according to claim 10, wherein the optically readable marker is obtained using a laser material machining method.

12. The method according to claim 1, wherein a device is provided for manufacturing the plurality of components, the device including a machining mechanism configured for providing the plurality of components with an information store, the device being configured for carrying out the method for manufacturing the plurality of components.

* * * * *